Figure 1:
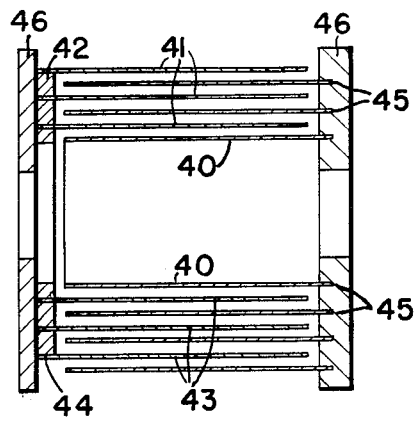

United States Patent [19]

Forkel

[11] Patent Number: 4,615,237
[45] Date of Patent: Oct. 7, 1986

[54] TORSIONAL VIBRATION DAMPER

[76] Inventor: Dirk Forkel, Eichenweg 18, 852 Erlangen, Fed. Rep. of Germany, 09131

[21] Appl. No.: 361,043

[22] Filed: Mar. 23, 1982

Related U.S. Application Data

[63] Continuation of Ser. No. 135,340, Mar. 31, 1980, abandoned, which is a continuation of Ser. No. 831,623, Sep. 8, 1977, abandoned.

[30] Foreign Application Priority Data

Sep. 10, 1976 [DE] Fed. Rep. of Germany ....... 2640751

[51] Int. Cl.$^4$ ............................................. F16F 15/12
[52] U.S. Cl. ........................................ 74/574; 188/379
[58] Field of Search ................. 74/574; 188/268, 290, 188/378, 379; 267/140.1; 308/DIG. 8

[56] References Cited

U.S. PATENT DOCUMENTS

| | | | |
|---|---|---|---|
| T973,005 | 8/1978 | Shyu et al. | 74/574 |
| 1,228,215 | 5/1917 | Junkers | 188/290 |
| 1,803,077 | 4/1931 | Spase | 74/574 |
| 2,838,955 | 6/1958 | Burch | 74/574 |
| 2,863,542 | 12/1958 | Kelsey | 192/58 B |
| 2,926,546 | 3/1960 | Paulsen | 74/574 |
| 2,987,938 | 6/1961 | Burch | 74/574 |
| 3,303,719 | 2/1967 | Beier | 74/574 |
| 3,362,510 | 1/1968 | Nash | 188/290 |
| 3,419,122 | 12/1968 | Connelly | 192/58 B |
| 3,536,175 | 10/1970 | Kawabe et al. | 192/58 B |
| 3,598,208 | 8/1971 | Bronder | 188/290 |
| 3,653,278 | 4/1972 | Brinkman | 74/574 |
| 3,823,619 | 7/1974 | Shotwell | 74/574 |
| 3,941,433 | 3/1976 | Dolling et al. | 308/DIG. 8 |
| 3,986,411 | 10/1976 | Kirby | 74/574 |
| 4,044,628 | 8/1977 | Jacks | 74/574 |
| 4,046,230 | 9/1977 | Troyer | 74/574 |
| 4,172,510 | 10/1979 | Forkel | 74/574 |

FOREIGN PATENT DOCUMENTS 750963 6/1933 France ................................. 64/9 R

*Primary Examiner*—Lawrence Staab
*Attorney, Agent, or Firm*—Kenyon & Kenyon

[57] ABSTRACT

A torsional vibration damper comprises an internal flange body and an external inertial body each having a plurality of intermeshing damper laminae fastened thereto along a margin and defining therebetween interstitial spaces filled with a highly viscous liquid and sealed off with resilient material. The damper laminae are generally cylindrical and are constructed in difference diameters in such gradation that the desired interstital spaces result between one lamina and the next larger one.

19 Claims, 8 Drawing Figures

TORSIONAL VIBRATION DAMPER

This is a continuation of application Ser. No. 135,340 filed Mar. 31, 1980, now abandoned which in turn was a continuation of Ser. No. 831,623 filed Sept. 8, 1977 now abandoned.

The invention relates to a torsional vibration damper operating with a viscous friction medium for limiting the vibration excursions and hence for limiting the stress especially on crankshafts in internal combustion engines. Such vibration dampers are known in a variety of types, and consist basically of a flange body rigidly affixed to the shaft and an inertial body rotatably or resiliently mounted thereon, which forms with corresponding surfaces of the flange body narrow interstices which are filled with a highly viscous liquid. The relative movements which occur between the flange body and the inertial body acting as the inert mass in the case of torsional vibrations result in high shearing forces in the interstices and thus produce the desired damping action.

Depending on the arrangement of the inertial body, a distinction can be made between dampers having an internal torsional mass, in which the flange body is in the form of a casing and completely envelope the inertial ring, and those having an external torsional mass in which seals are necessary between the flange body and the inertial body enveloping the interstices.

Although the last-mentioned embodiment using an external inertial mass would have obvious advantages, consisting in the greatly reduced solid mass of the flange body due to the elimination of the housing and in the accessibility of the inertial body, only the fully enclosed design with its simple construction has hitherto been adopted in practice. Nevertheless, this construction has a number of weaknesses, which are manifesting themselves more and more unpleasantly especially in the case of engines subject to greater stress.

Some of the particular disadvantages are the limitation of the interstitial surface area, which is given by the surface area of the inertial ring, and, as a result thereof, the very narrow interstices which are unavoidable if optimum coupling is to be achieved with the oil viscosities available and, as an additional consequence thereof, the very small volume of the viscous friction medium, in which the entire work of the damper must be transformed into heat.

As it is known, between the above-named three magnitudes, at a given viscosity and a given diameter, the coupling is proportional to the interstitial surface area and inversely proportional to the width of the interstices, while the volume corresponds to the product of the two magnitudes. Thus, for example, a doubling of the interstice surface area over conventional dampers would permit twice the interstice width and result in four times the working volume.

The above-mentioned disadvantages are all thus interrelated and requires not only a high surface quality and precision of form, but they also easily result in thermal and mechanical overstressing of the silicone oils used and thus to the ruination of the damper.

Furthermore, the internal pressure occurring during operation as a result of the temperature rise undesirably deforms the housing, resulting in a reduction of the damping action, and also resulting in interference and wearing of the inertial ring against the casing. Another problem is the very precise guidance of the inertial ring by means of the conventional friction bearing which is endangered, especially at high loads and upon the occurrence of axial vibrations, due to the poor lubricating properties of the silicone oils used and the relatively narrow bearing clearance in which the silicone oils might be stressed beyond their shear strength.

The fact that no practical solution has yet been found for a viscosity damper with an external inertial mass is evidently because in this case not are only the above-mentioned disadvantages of the enclosed construction eliminated, but also additional problems have to be solved, which are the result of the additionally required seal between the flange body and the torsional body, and of additional solid sealing surfaces between the individual parts of the two bodies, in view of the considerable creeping ability (low surface tension) of the silicone oils used and the internal pressures that occur. Furthermore, for the practical embodiment, there is the very important problem of finding for this basically more expensive damper construction consisting of more parts, a design which will permit competitively inexpensive manufacture along with no greater external dimensions.

Thus, solutions have been proposed in which, instead of friction seals which are unusable in sustained operation, seals of resilient material are proposed, which are under bias or are vulcanized on, and at the same time are to provide for the precise guidance of the flywheel. Such a construction (described for example in German Guslegeschrift No. 1295287), however, has the disadvantage that, although the radial and axial rigidity are adequate, the necessary movement in the tangential direction upon the occurrence of torsional vibrations is made possible only by sliding or by severe deformations, both of which would result in difficulties in sustained operation. In another proposal made in German Oftenlegungsschrift No. 2362128, this problem is not solved, either, because in the case of the rubber rings installed by vulcanization, the same comments apply on account of the little amount of space available, while in the case of the likewise proposed friction bearings, a long life of the O-rings cannot be achieved. In short, therefore, the proposed solutions that have become known for the combined mounting in bearings and sealing of the inertial body against the flange body have the disadvantage that they re unable to satisfy the requirements as to greater precision and accordingly rigidity in the radial and axial directions, combined with sufficiently great elasticity in the circumferential direction, and that they furthermore do not have sufficient volume to accommodate the deforming work that occurs in sustained operation.

In addition, no provision is made for the prevention of a rise in the internal pressure when the damper becomes heated, which would be harmful to the seals themselves, or for the protection of the seals against it.

As regards the tight seal between the individual parts of the damper to be mounted, an embodiment in accordance with German Auslegeschrift No. 1295287 does appear to be feasible, but in this case the interstitial surface area is not greater than it is in the case of conventional enclosed damper constructions. On the other hand, the arrangement shown in German Offenlegungsschrift No. 2362128 of a plurality of intermeshing disks and intermediate rings permits a certain enlargement of the total interstitial surface area (although it can hardly be utilized at the given external dimensions of the damper due to the division called for here, into an inertial mass part and a damping part), but it achieves this at the cost of the disadvantage of four flat seals per pair of lamins or of correspondingly precisely machined sealing surfaces, which in either case involves higher manufacturing costs.

It is the object of the invention, therefore, to avoid both the above-mentioned disadvantages of conventional viscosity dampers with internal inertial mass and those of the hitherto disclosed proposals for the construction of dampers with external inertial mass.

This object is achieved in a torsional vibration damper having interstices provided between the flange body and the inertial body, which are filled with a high-viscosity liquid and sealed, if desired, with resilient material, in that, in accordance with the invention, for the creation of the interstices, lamins are disposed on the flange body and on the torsional body, which are curved in the area of action and intermesh with one another. Due to the curvature the lamins achieve a great stability of shape and can therefore be made of a thin and less strong material, so that, without enlargement of the dimensions of the damper, the decisive increase of the interstitial surface areas can be achieved in an especially economical manner with greatly reduced accuracy requirements. In an embodiment which lends itself especially to large-series production, the lamins are cylindrical and are constructed in different diameters in such gradation that the desired interstice width results between one lamin and the next larger one. These lamins re then centered and fastened alternately end-wise on a corresponding surface of the inertial body and of thhe flange body.

In another embodiment, which, however, is suitable only for vibration dampers with a resilient connection between the inertial body and the flange body, the lamins form not cylindrical surfaces but an opened cylindrical surface with a spiral ground plan. Such a spiral lamin body is fastened end-wise to a corresponding surface of the inertial body, and a second similar spiral lamin body is turned one half revolution and is fastened at the other end to a corresponding surface of the flange body, and the lamins are inserted into one another precisely as in the case of cylindrical lamins. The pitch of the spirals or, better, the clearance from one turn of the spiral to the next is such as to form twice the desired interstice width plus the thickness of the opposite lamin which is to be inserted between the turns. In both embodiments, the lamins can be made of sheet metal or can be cast by a precise method. In the case of pressure-cast lamins, for example, the thickness of the lamins will have to increase toward the base at the end, so that, if the second lamin body is of the same construction, the width of the interstice will be the same over the entire surface of the lamins, since the two boundary surfaces are of a slightly conical configuration. Lamins made from sheet metal are better inserted and fastened edgewise into grooves in the flange body and in the inertial body, respectively. This method is suitable both for cylindrical lamins and for spiraliform lamins. Another method of fastening is to assemble the cylindrical lamins of different diameter with narrow rings between them as spacers, and then to join the lamin body thus obtained to the inertial body or flange body of the damper. This method is especially suitable for making a lamin body of spiraliform cross section, which in this case can be wound in one operation from a strip of sheet metal of the width of the lamins and a narrow spacer band within and at one side of the strip and fastened thereto by soldering, for example.

The embodiments of curved lamins which have been described can be used not only in a vibration damper having an internal inertial body surrounded by a flange body in the form of a casing, but also in dampers having an external inertial body in which the interstices are sealed against the flange body. In the former case the lamins are best constructed such that with their great surface area they contribute towards the relief of the bearing from stress. To compensate for a temperature-caused change in the volume of the damping liquid, it is desirable in this case to place an annular sheet metal membrane on the face end of the flange body casing, the said membrane being welded on by means of two annular welds and communicating with the interior of the vibration damper.

In the second case of a damper having an external inertial body, no special measures are necessary for volume compensation if the bearing and sealing rings which join the inertial body and flange body in a torsionally resilient manner and seal the gaps are constructed resiliently in the axial direction such that the enlargement of the volume of the interstices can be accomplished by a slight axial displacement without any important build-up of pressure in the interior of the damper.

Also, in all embodiments of the invention, the problem of the maintenance-free and wear-free mounting and guiding of the inertial body and of the sealing of the interstitial space is solved in accordance with the invention in that at least two resilient bearing and sealing rings of approximately rectangular cross section are inserted between the flange body and the inertial body. To minimize the specific stress and development of heat in these rings, they are made as large as possible and extend over the entire structurally available width. The arrangement of the bearing and sealing rings is furthermore such that the necessary greater stiffness, especially for the radial guidance of the inertial body, is achieved without impairing the elasticity in the circumferential direction. This can be achieved by arranging the rings between axial surfaces, i.e., between cylinder surfaces, but also by arranging the rings between radial surfaces, especially when the latter extend to relatively large diameters. A slight tapering of the rings, i.e., their disposition between conical surfaces, results, in the case of rubber rings not vulcanized in place, in the additional advantage of a very easy installation in the axial direction.

Two rings can fundamentally be arranged symmetrically with the central plane of the damper, in which case they both serve simultaneously for mounting, guidance and sealing. At the same time, the rings can lie either with their inside diameter on a correspondingly constructed part of the flange body and bear the inertial body at their outside diameter, or they can lie with their outside diameter on a corresponding surface of the flange body and bear on their inside diameter an overlapping cap of the inertial body.

In a non-symmetrical design of the vibration damper, this dual function is served substantially by only one bearing and sealing ring which extends over the entire available width of the damper, while the other ring has naught but sealing functions and accordingly consists of more resilient material. Such an asymmetrical design can, under certain circumstances, be better cost-wise, and it can be used especially when the mounting flange of the damper is not to be located in the central plane for other reasons.

In all cases, the resilient rings can be made anisotropic for the purpose of improving their bearing and guiding properties by making them yielding in relation to shear forces in the circumferential direction, but stiff against forces especially in the radial direction for the accommodation of the bearing forces. This can be achieved, for example, by causing the ring to be composed of layers of different hardness, the interfaces between them being situated in the radial planes contained in the central axis. In this case the rings can also be composed of rubber types having different resiliencies. Such stiffeners or inserts reduce the resiliency of the ring in the case of radial or axial stress, while in the case of tangential stress the desired resiliency in the circumferential direction is virtually unimpaired.

A variant that is desirable from the production point of view consists in the fact that the numerous radially disposed reinforcements which are vulcanized into the ring are not inserted individually, but are strung together in a meander-like band. The bending points are weakened such that, in the case of tangential shear, no great bending moments can occur. Without this weakening, which can be in the form of a scoring for breakage, the resiliency would be undesirably reduced with regard to tangential stress.

Figure 2:
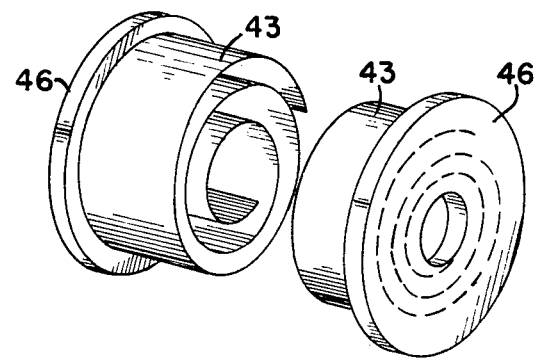
Figure 3:
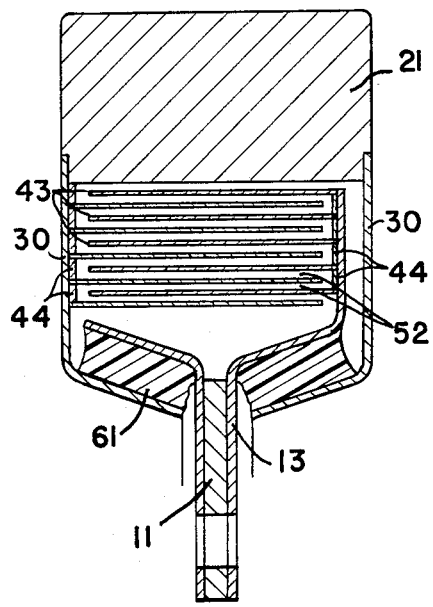
Figure 4:
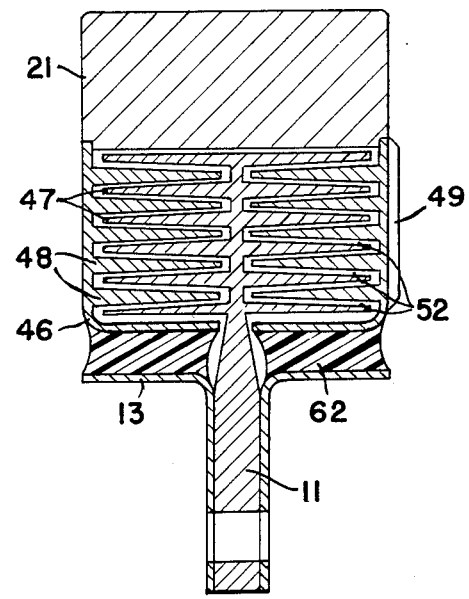
Figure 5:
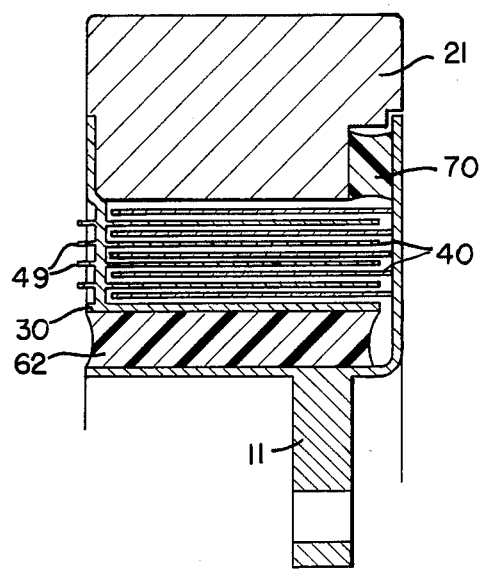
Figure 6:
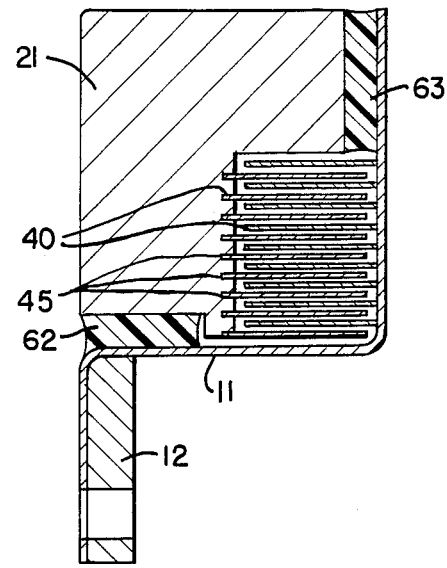
Figure 7:
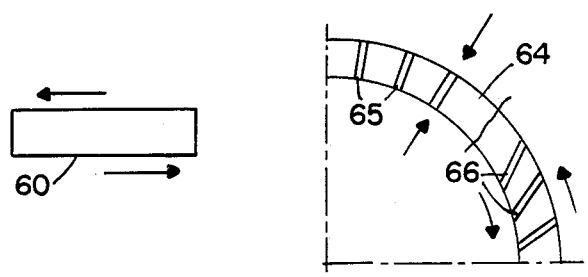
Figure 7:
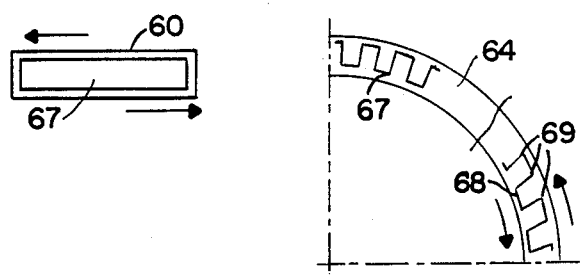
Figure 8:
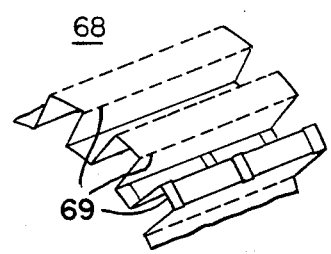

The invention will be described below with the aid of a number of its embodiments which are represented diagrammatically in FIGS. 1 to 8 of the appended drawing, wherein:

FIG. 1 is a cross-sectional view of the curved, intermeshing lamins,

FIG. 2 is a perspective representation—here drawn apart axially—of the spiraliform lamins, FIG. 3 shows by way of example a vibration damper construction having spiral lamins, an external inertial body and two-conical bearing and sealing rings, FIG. 4 shows a variant having bilateral, symmetrical lamins on the flange body, in a pressure-cast construction, FIG. 5 represents an asymmetrical construction having a wide cylindrical bearing and sealing ring and another ring serving only for sealing purposes, FIG. 6 is another asymmetrical construction with one radial and one axial bearing and sealing ring, FIGS. 7 and 8 are examples of the anisotropic construction of the bearing and sealing rings.

FIG. 1 shows in detail the arrangement of the axially intermeshing curved lamins 40 which are fastened by their edges to the lamin holders 46 which, in turn, are parts of the inertial body and flange body, respectively. The fastening of the cylindrical lamins 41 in the upper part of the figure is accomplished either by means of the spacing rings 42 or, for example, by means of the concentric grooves 45. In the lower part of the figure are shown the spiraliform lamins 43 (not distinguishable in the cross section), which are held by a likewise spiraliform spacing band 44 or, in the right half of the figure, by spiral grooves 45.

In FIG. 2, the arrangement of the spiral lamins 43 is again shown in an exploded perspective representation.

FIG. 3 shows an embodiment of a spiral lamin vibration damper having an external inertial body 21 which is supported by the caps 30 and two resilient bearing and sealing rings 61 which in this case are disposed between conical surfaces, on the bearing support 13 of the flange body 11. The intermeshing spiraliform lamins 43 are held in their position by the spacing bands 44 and are fastened, by hard soldering for example, to portion 13 of the flange body and to a cap 30 of the inertial body, respectively.

FIG. 4 shows an embodiment using cylindrical lamins 47 which are constructed in bilateral symmetry with the central plane of the damper, by die-casting methods involving the necessary draft so that, accordingly, they increase in thickness towards the central plane. The lamin holder flares inwardly toward the flange 11, to which the bearing supports 13 are fastened on both sides. The two cylindrical bearing and sealing rings 62 bear on their outside diameter the cylindrical margin 46 of the lamin holder, which in this case bears the lamins 48 which are also made of die-cast metal, and which is fastened at its outside diameter to the inertial body 21. Since the lamins 48 are also given draft on both sides, the interstice 52 formed between them and the lamins 47 is of equal width at all points. The lamin holder on the flywheel side can, as shown in the right half of the figure, be provided with cooling fins 49 for better removal of heat.

In FIG. 5 there is shown an asymmetrical design of the damper with curved lamins 40, in which a wide bearing and sealing ring 62 is mounted on the flange body 11 and bears on its outside diameter the correspondingly shaped cap 30 of the inertial body. In another embodiment of the circular and spiraliform lamins, the latter are carried outwardly beyond the lamin holder and form the annular or spiral cooling ribs 49 for better cooling. The second ring 70 serves in this embodiment only for sealing purposes.

In an additional asymmetrical variant shown in FIG. 6, the flange body 11 is a simple drawn sheet metal piece and is reinforced in the vicinity of its inside diameter by the ring 12. It bears the two bearing and sealing rings 62 and 63, which are vulcanized in place and are constructed axially and radially in this case. The inertial body 21 in this example, which is also bonded to the sealing rings, accommodates the curved lamins 40 in the grooves 45.

FIGS. 7 and 8 illustrate embodiments of the anisotropic configuration of the bearing and sealing rings. In FIG. 7, in an end view 64 of such a ring, the narrow layers 65 are of harder material and extend over the entire width in the cross sectional view 60 of the ring. Under the action of shear forces in the circumferential direction, these layers or inserts are set slightly aslant as shown at 66, without thereby appreciably affecting the desired elasticity in the tangential direction. In the case of compressive stress in the radial direction (indicated by arrows), they act, however, in a stiffening manner as desired. The same effect also occurs in the case of shear stresses in the axial direction.

In FIG. 8, finally, another embodiment of the inserts is shown, in which, for reasons of ease in manufacture, they are constructed continuously in the form of a band 67 bent back and forth meander-wise. In order to avoid an impairment of resiliency when, under the effect of shear forces, the radially disposed reinforcements are set aslant, the bends 69 in the meander-like band 68 are either slightly weakened or they are in the form of scoring for breakage, as represented in the perspective illustration.

I claim:

1. Torsional vibrational damper comprising a flange body for mounting on a rotatable shaft, an external inertial body which is radially outwardly disposed with respect to said flange body, means performing an insignificant inertial mass function and defining a plurality of interstitial spaces provided between the flange body and the inertial body comprising a plurality of intermeshing axially extending thin laminae having opposed curved surfaces in the area of action, said plurality of intermeshing thin laminae overlapping in the radial direction wherein said plurality of intermeshing laminae are provided by a first thin laminae set formed from axially extending and radially spaced apart concentric curved surfaces disposed on said inertial body radially inward from said inertial body interleaved by second thin laminae set formed from axially extending and radially spaced apart concentric curved surfaces disposed on said flange, a highly viscous liquid filling the interstitial spaces, means for joining said inertial body to said flange body and for sealing the spaces comprising resilient material and wherein said laminae are of spiral-form configuration.

2. Torsional vibration damper of claim 1 wherein the laminae are of cylindrical configuration.

3. Torsional vibration damper of claim 1 wherein the laminae are formed from sheet metal.

4. Torsional vibration damper of claim 1 wherein the laminae are cast of pressure-cast metal.

5. Torsional vibration damper of claim 1 wherein the means defining the spaces comprises grooves in the flange body and the inertial body and the laminae are inserted and fastened endwise into the grooves in the flange body and inertial body.

6. Torsional vibration damper of claim 1 wherein the means defining the spaces comprises a plurality of laminae which are assembled with intermediate layers as spacers.

7. Torsional vibration damper of claim 1 wherein the flange body comprises a housing and bears laminae on an internal radial surface thereof.

8. Torsional vibration damper of claim 1 wherein the inertial body is located outside of the flange body and the means for sealing of the interstitial spaces is disposed between the inertial body and the flange body.

9. Torsional vibration damper of claim 8 wherein the sealing means comprises at least two resilient rings of approximately rectangular cross section.

10. Torsional vibration damper of claim 9 wherein the rings extend over the entire structurally available axially extending width of said joining means.

11. Torsional vibration of claim 9 wherein the rings are disposed between axial surfaces.

12. Torsional vibration damper of claim 9 wherein the rings are disposed between radial surfaces.

13. Torsional vibration damper of claim 9 wherein the rings are disposed between conical surfaces.

14. Torsional vibration damper of claim 9 wherein the ring arrangement is symmetrical with the center plane and both rings serve for mounting and sealing.

15. Torsional vibration damper of claim 9 wherein only one ring accommodates bearing forces, while the other has only sealing functions and consists of more resilient material.

16. Torsional vibration damper of claim 9 wherein the rings are constructed anisotropically such that they perform softly in relation to shear forces in the circumferential direction, but perform stiffly in the radial direction to accommodate the bearing forces.

17. Torsional vibration damper of claim 16 wherein the rings are composed of laminations of different hardness, the interfaces being located in radial planes containing the central axis.

18. Torsional vibration damper of claim 16 wherein the rings are composed of types of rubber of various resiliency.

19. Torsional vibration damper of claim 16 further comprising reinforcements vulcanized into the rings, including a meander-like band of sheet metal having weakened bending points.

* * * * *